United States Patent [19]
Yamanaka

[11] Patent Number: 6,006,593
[45] Date of Patent: Dec. 28, 1999

[54] METHOD USING CANTILEVER TO MEASURE PHYSICAL PROPERTIES

[75] Inventor: Kazushi Yamanaka, Tsukuba, Japan

[73] Assignee: Agency of Industrial Science & Technology, Ministry of International Trade & Industry, Tokyo, Japan

[21] Appl. No.: 08/753,933

[22] Filed: Dec. 3, 1996

[30] Foreign Application Priority Data

Dec. 6, 1995 [JP] Japan ................................. 7-344902

[51] Int. Cl.⁶ .................................................. G01B 5/28
[52] U.S. Cl. .................................................. 73/105
[58] Field of Search ........................... 73/105, 81, 82; 250/306

[56] References Cited

U.S. PATENT DOCUMENTS

| | | |
|---|---|---|
| 3,820,040 | 6/1974 | Berry et al. . |
| 5,189,906 | 3/1993 | Elings et al. ............................ 73/105 |
| 5,262,643 | 11/1993 | Hammond et al. . |
| 5,412,980 | 5/1995 | Elings et al. . |

FOREIGN PATENT DOCUMENTS 06323843  11/1994  Japan .

OTHER PUBLICATIONS

G. Binnig, et al. "Atomic Force Microscope", Physical Review Letters, vol. 56, No. 9, (pp. 930–933), Mar. 3, 1986.
Kazushi Yamanaka, et al. "Ultrasonic Force Microscopy for Nanometer Resolution Subsurface Imaging", Appl. Phys. Lett., vol. 64, No. 2, (pp. 178–180), Jan. 10, 1994.
U. Rabe, et al. "Atomic Force Microscopy at MHz Frequencies", Ann. Physik 3, (pp. 589–598), Jul. 22, 1994.
M. Radmacher, et al. "Imaging Viscoelasticity by Force Modulation with the Atomic Force Microscope", Biophysical Journal, vol. 64, (pp. 735–742), Mar. 1993.

Primary Examiner—Robert Raevis
Attorney, Agent, or Firm—Oblon, Spivak, McClelland, Maier & Neustadt, P.C.

[57] ABSTRACT

A method of measuring physical properties using a cantilever comprises bringing a tip attached at one end of a cantilever into contact with a sample and causing a vibrational force of a frequency between 10 and 1000 times the fundamental resonance frequency of the cantilever to act on the cantilever.

7 Claims, 7 Drawing Sheets

METHOD USING CANTILEVER TO MEASURE PHYSICAL PROPERTIES

BACKGROUND OF THE INVENTION

1. Field of the Invention

This invention relates to a method using a cantilever to measure physical properties

2. Description of the Prior Art

The atomic force microscope (G. Binnig, C. F. Quate and Ch. Gerber, Phys. Rev. Lett. 12, 930, 1986) is an example of an apparatus that uses a cantilever to measure minute irregularities on the surface of a sample. The atomic force microscope is a new type of microscope which images irregularities within a minute region by utilizing the deflection induced in a cantilever supporting a tip owing to the force acting between the sample surface and a probe. Methods have been proposed for using the atomic force microscope to measure the defect distribution, elasticity and other physical properties of a sample by detecting the vibration induced in the cantilever when the sample is vibrated at a much higher frequency than its fundamental resonance frequency [K. Yamanaka, H. Ogiso and O. Kolosov: Appl. Phys. Lett. 64, 178 (1994) and U. Rabe and W. Arnold: Ann. Physik 3,589 (1994)]. These methods can measure the elasticity of hard materials, which is not possible with the force modulation method in which the sample is vibrated at a frequency about the same as or lower than the fundamental resonance frequency of the cantilever [(M. Radmacher, R. W. Tillmann, and H. E. Gaub: Biophys. J. 64, 735 (1993)].

Since these prior-art methods vibrate the sample at high frequency, however, the sample has to be bonded to an ultrasonic vibrator. This bonding involves various problems:

(1) The optimum bonding agent has to be selected for each type of sample. Thickness variations and bubbles occurring in the bonding agent cause uneven vibration and degrade measurement reproducibility.
(2) Bonding agents are a cause of sample contamination and cannot be used with LSI wafers and other such samples requiring a high degree of cleanness.
(3) A large or irregularly shaped sample is hard to vibrate uniformly by contact with a vibrator. The method of bonding the sample to the vibrator can therefore not be used for inspecting such industrially important components as large LSI wafers, magnetic heads and bearings.

This invention was accomplished in response to the foregoing circumstances and has as one object to provide a method which uses a cantilever to measure physical properties with high reproducibility, specifically to such a method which, without requiring the sample under examination to be bonded to a vibrator, achieves the same effect as when the sample is vibrated.

Another object of the invention is to provide a method which uses a cantilever to measure physical properties, specifically to such a method which can be readily applied to measure the physical properties of a sample requiring a high degree of cleanness or a sample of large size or irregular shape.

In this specification, "measurement of physical properties" and similar expressions are defined to include the measurement of the distribution of defects at and in the vicinity of the sample surface and the measurement of sample elasticity.

SUMMARY OF THE INVENTION

For achieving the aforesaid objects, the invention provides a method using a cantilever which imparts ultrasonic waves to measure physical properties comprising the steps of bringing a tip attached at one end of a cantilever into contact with a sample and causing a vibrational force of a frequency between 10 and 1000 times the fundamental resonance frequency of the cantilever to act on the cantilever, thereby exciting higher order mode vibration in the cantilever.

When the cantilever imparted with higher order mode vibration in the aforesaid manner is brought in contact with the sample, the sample is deformed in a manner depending on the vibrational pattern of the cantilever. The physical properties of the sample can therefore be measured by measuring the cantilever vibration.

Accordingly, the invention method provides various advantages. For example, since the sample is not bonded to the vibrator, no need arises to select the optimum bonding agent for each type of sample and no possibility exists of thickness variations and/or bubbles occurring in a bonding agent causing uneven vibration or degrading measurement reproducibility. In addition, since no possibility of sample contamination by a bonding agent arises because none is required, the method can be used with LSI wafers and other such samples requiring a high degree of cleanness. Moreover, since no need arises to impart vibration to the sample, the method can be used to inspect large and/or irregularly shaped samples, such as large LSI wafers, magnetic heads and bearings and other industrially important components.

The above and other objects, characteristic features and advantages of this invention will become apparent from the description given hereinbelow with reference to the accompanying drawings.

DESCRIPTION OF THE PREFERRED EMBODIMENT

Figure 1:
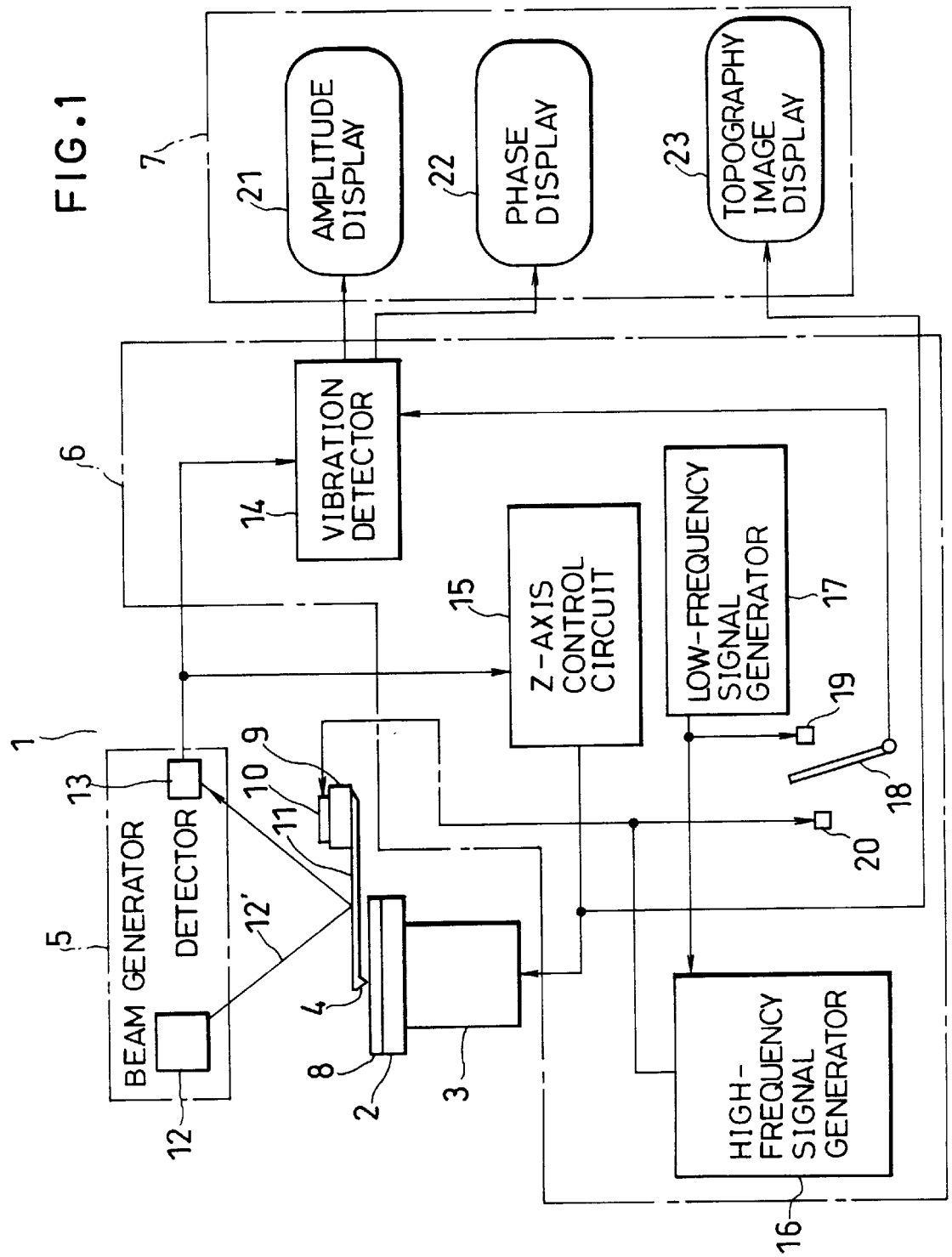
FIG. 1 is a block diagram of an apparatus using a cantilever to measure physical properties according to the invention.
Figure 2:
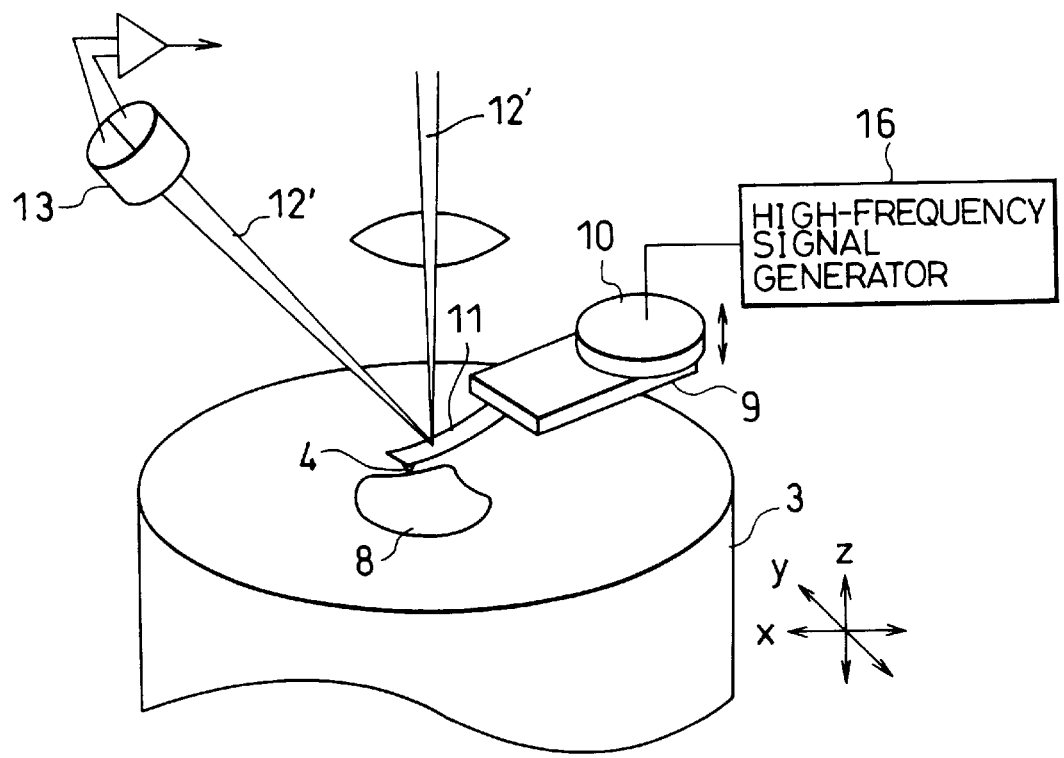
FIG. 2 is a schematic view for explaining an apparatus using a cantilever to measure physical properties according to the invention.
Figure 3:
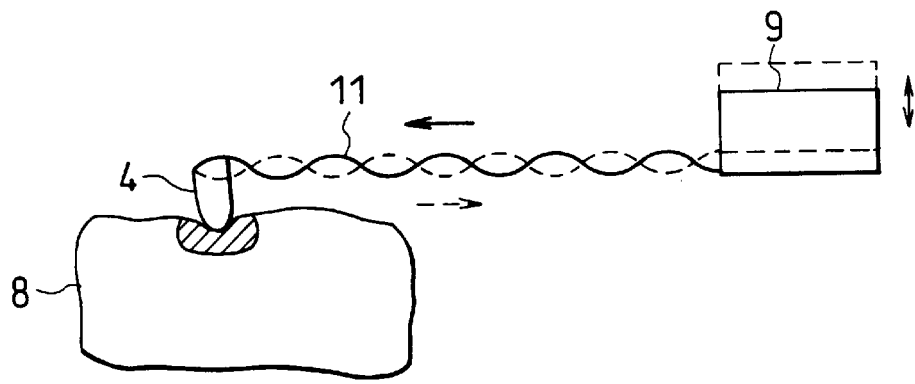
FIG. 3 is a diagram for explaining the relationship between the probe and the sample in the apparatus of FIG. 2.

The invention will now be explained in detail with reference to an embodiment thereof applied to an atomic force microscope. In the embodiment shown in FIGS. 1–3, an atomic force microscope 1 is adopted as an example of an apparatus using a cantilever to measure physical properties. The atomic force microscope 1 is equipped with a sample stage 2, a sample stage driver 3, cantilever 11 having a tip 4, a cantilever measuring instrument 5, a controller 6 and a display 7. A sample 8 can be mounted on the sample stage 2 and the sample stage 2 can be driven two dimensionally by the sample stage driver 3, which can, for example, be constituted as a sample-scanning piezoelectric element.

Figure 4A:
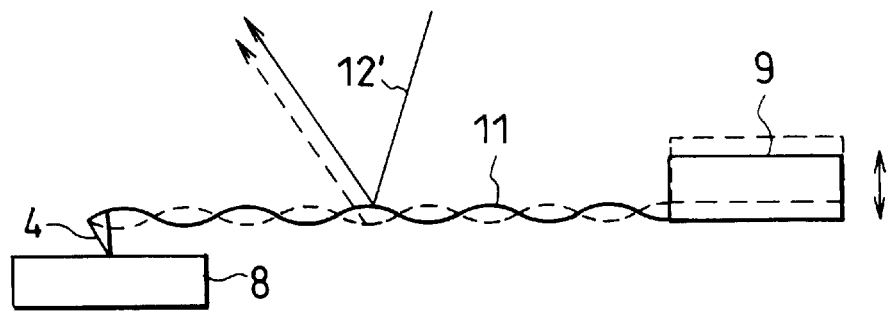
FIG. 4 is a set of diagrams for explaining the principle of a method for optically detecting cantilever vibration, wherein FIG. 4(a) relates to detection when the angular change of the cantilever is small and FIG. 4(b) to the detection when the angular change of the cantilever is large.
Figure 4B:
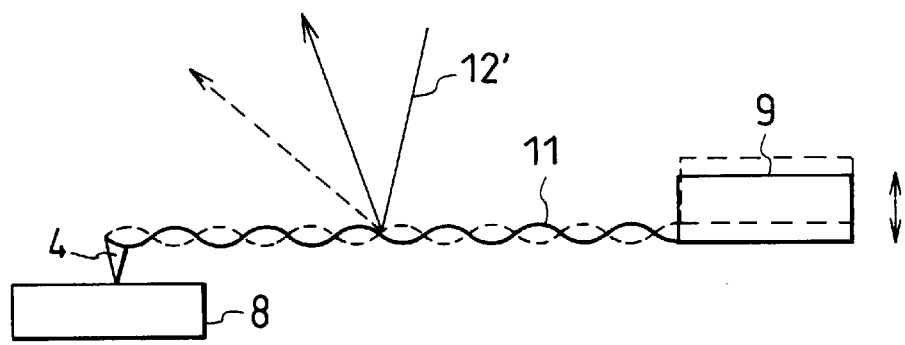

The sample 8 whose properties are to be measured is mounted on the sample stage 2 and the tip 4 of the cantilever 11 is placed in contact therewith. The cantilever 11, which is so soft as to be deformed by a minute force on the order of 1 nN, is fixed to a support member 9. A transducer 10 for imparting vibration to the cantilever 11 is attached to the support member 9. (The direction of the vibration is indicated by arrows.) An ultrasonic vibrator, a thermoelastic heat source using a laser or the like can be used as the transducer 10. The transducer 10 can induce higher order mode vibration in the cantilever 11. The vibration induced in the cantilever 11 is detected as the ac component of a signal produced by an optical deflection detector 13, the amplitude and phase of the vibration are measured by a vibration detector 14, and an image of the vibration distribution is displayed by recording the measurement results as the sample 8 is scanned two-dimensionally within an X-Y plane. The cantilever measuring instrument 5 comprises a laser beam generator 12 and the optical deflection detector 13. The laser beam generator 12 directs a laser beam 12' onto the cantilever 11 and the optical deflection detector 13 detects the reflected light from the cantilevers 11 for measuring the position and attitude of the cantilever 11. As shown in FIG. 4, the cantilever measuring instrument 5 can employ an optical detection method for detecting change in the slope of the portion irradiated with a laser beam. In the illustrated case, the laser beam 12' is converged on a portion of the cantilever 11 and the reflected beam is detected by a segmented photodiode. When the cantilever 11 bends, the direction of the reflected beam changes to cause a change in the output of the photodiode. The signal output by the photodiode is small when the angular change of the cantilever is small (FIG. 4(a)) and is large when the angular change of the cantilever is large (FIG. 4(b)). The detection sensitivity therefore varies with the position from which the laser beam is reflected. The position and attitude of the cantilever are thus detected and the amplitude and phase of the vibration determined.

As the optical deflection detector 13 there can be used a position sensitive detector (PSD) divided into four (left, right, top, bottom) segments.

Figure 5:
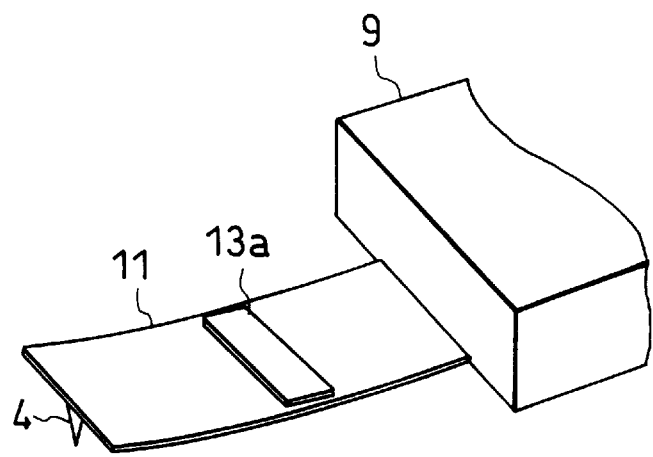
FIG. 5 is a diagram for explaining detection of cantilever vibration with a vibration detector.
Figure 6A:
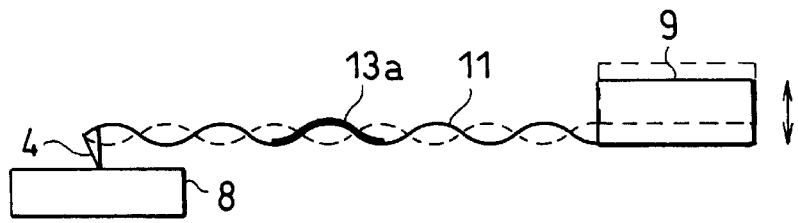
FIG. 6(a) is a diagram for explaining the state of the vibration sensor when the cantilever is imparted with vibration to which the vibration sensor exhibits high sensitivity.
Figure 6B:
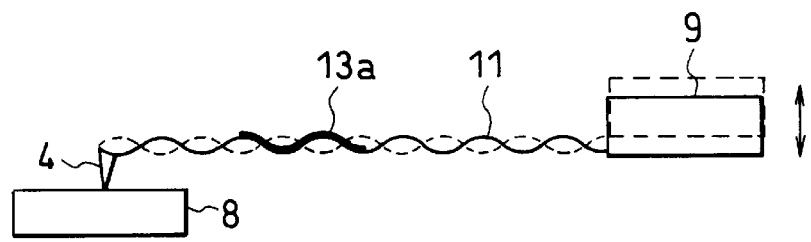
FIG. 6(b) is a diagram for explaining the state of the vibration sensor when the cantilever is imparted with vibration to which the vibration sensor exhibits low sensitivity.

It is also possible to measure the deflection and vibration of the cantilever using a vibration detector provided on the cantilever. As shown in FIG. 5, the vibration detector can be a piezoelectric transducer fabricated by attaching a PZT or other such piezoelectric thin-film sensor 13a to one surface of a cantilever 11 microprocessed from silicon or the like. While the detection method shown in FIG. 4 requires precise adjustment of the laser beam spot on the cantilever 11, the detection method using the piezoelectric thin-film sensor shown in FIG. 5 does not require precision adjustment since the sensor position is fixed. However, since the sensor exhibits high sensitivity at some frequencies (FIG. 6(a)) and low sensitivity at other frequencies (FIG. 6(b)), it is necessary to select a frequency at which the sensor sensitivity is high.

The controller 6 is provided with the vibration detector 14, a Z-axis control circuit 15, a high-frequency signal generator 16, a low-frequency signal generator 17, a switch 18, a terminal 19 and a terminal 20. The vibration detector 14 detects the amplitude and phase of the vibration signal input to the switch 18. The display 7 includes a vibration amplitude image display 21, a vibration phase image display 22 and a topography image display 23. The Z-axis control circuit 15 receives the signal from the optical deflection detector 13 and outputs a control signal corresponding to the position and attitude of the cantilever 11 to the sample stage driver 3 for controlling the position of the sample stage 2 on the Z-axis (vertical axis). The vibration amplitude image display 21 of the display 7 receives the signal from the vibration detector 14 and displays an image of the vibration amplitude of the cantilever 11. The topography image display 23 images the surface irregularities at the portion of the sample 8 contacted by the tip 4 based on the position and attitude of the cantilever 11.

In this invention, the cantilever is vibrated at 10–1000 times its fundamental resonance frequency measured with the tip separated from the sample. The lower limit of the vibration frequency is set at ten times the fundamental resonance frequency because the frequencies of the second and higher order vibrations of the cantilever when the probe is in contact with the sample are ten or more times the fundamental resonance frequency of the cantilever. The upper limit of the vibration frequency is set at 1000 times the fundamental resonance frequency of the cantilever because it is difficult to use higher frequencies owing to a sharp drop in the vibration excitation efficiency above this level.

The measurement of sample physical properties with the atomic force microscope 1 of the foregoing configuration will now be explained. The sample 8 is mounted on the sample stage 2 and the tip 4 of the cantilever 11 is placed in contact with the sample 8. The cantilever 11, which is so, soft as to be deformed by a minute force on the order of 1 nN, is fixed to the support member 9. The contact force between the tip 4 and the sample 8 is maintained constant by controlling the height of the sample to produce a constant bending deflection in the cantilever 11. The irregularities of the sample are measured by scanning the sample in the X and Y directions within a horizontal plane. Higher order mode vibration is excited in the cantilever at this time. Since the tip is in contact with the sample, the vibration mode is affected by the sample and changes. The physical properties of the sample at the portion in contact with the tip can be measured by measuring and analyzing this cantilever vibration.

Three methods are available for measuring cantilever vibration: (1) the linear detection method, (2) the nonlinear detection method and (3) the difference-frequency method.

(1) Linear detection method

This method detects the component of the vibration excited in the cantilever having the same frequency as the drive force by using the high-frequency signal generator 16 to drive the support member 9 with the switch 18 in contact with the terminal 20. When a cantilever having a fundamental resonance frequency of 10– 50 KHz is used, the 10–1000-fold vibration frequency is in the range of 100 KHz–50 MHz.

Although an atomic force microscope is not ordinarily equipped with a detector sensitive to this high-frequency band, the needs of this invention can be met by installing it with an optical signal amplification circuit with a frequency response extending to the vibration frequencies. The addition of such a circuit is relatively easy. The method of measuring change in the resonance frequency of the cantilever is particularly suitable for high-precision measurement of sample elasticity.

(2) Nonlinear detection method

This method detects a low-frequency amplitude modulation vibration component of the vibration excited in the cantilever by using the low-frequency signal generator 17 to amplitude modulate a high-frequency vibrational drive force with the switch 18 in contact with the terminal 19. Since a vibration detector 14 with a frequency response extending to around 50 KHz is sufficient in this case, the atomic force microscope can be used without modification. Since the low-frequency vibration component is produced by a nonlinear interaction between the tip and the sample, however, this detection method is more complex than the linear detection method owing to the need to take the nonlinear interaction into consideration in the analysis for determining the elasticity of the sample from the detection signal.

Nevertheless, comparisons can be conducted using calibration curves based on reference material. Moreover, since the frequency of the detection signal is different from the drive signal produced by the high-frequency signal generator 16, the method is unaffected by vibration noise. It therefore has the advantage of enabling stable measurement and imaging.

(3) Difference-frequency method

This method detects a component of the cantilever vibration whose frequency is the difference between the cantilever drive frequency and the sample vibration frequency, by vibrating the sample at a frequency different from the cantilever drive frequency. In this case, vibration also has to be excited in the sample. It is also necessary to take nonlinear effects into consideration during the analysis. The method is advantageous, however, in that the phase of the vibration can be easily measured and the amplitude of the vibration can be maintained constant.

Examples of measurements conducted according to the invention will now be explained.

[1] Measurement of sample elasticity using higher order mode vibration

The reason for being able to discriminate differences in sample elasticity by use of higher order mode vibration will first be explained in terms of promotion of sample deformation and change in cantilever resonance frequency.

(1) Promotion of sample deformation

To investigate the promotion of sample deformation in higher order mode, the resonance mode of the cantilever when it is in contact with the sample is analyzed by the finite element method. Take as a specific example a silicon nitride cantilever measuring 200 $\mu$m in length, 20 $\mu$m in width and 0.8 $\mu$m in thickness. The spring constant k of such a cantilever is 0.045 N/m. Assume the sample to be a metal or ceramic having a spring constant, or contact stiffness, s of 100 N/m.

Figure 7A:
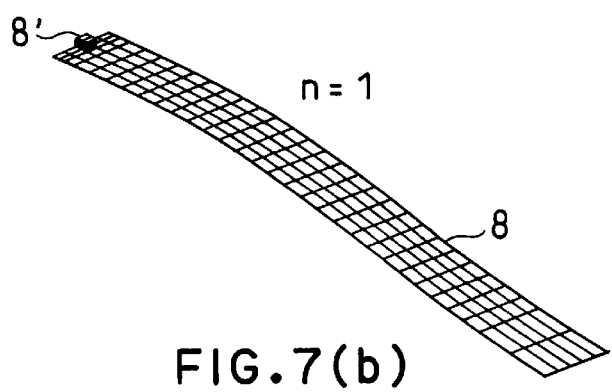
FIG. 7(a) is a diagram for explaining the fundamental mode vibration pattern of a cantilever.
Figure 7B:
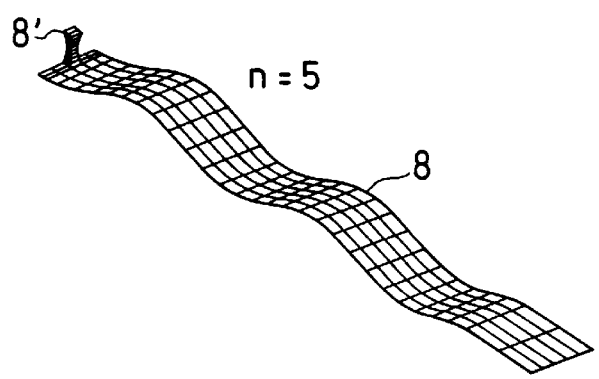
FIG. 7(b) is a diagram for explaining the higher order mode vibration pattern of a cantilever.

The vibration pattern of the cantilever was calculated using the finite element method. The results are shown in FIG. 7. The calculation was conducted using a finite element method system. The eigen mode of the vibration was analyzed for the boundary conditions of the cantilever being fixed at its right end and being supported by a linear spring at its left end. The small cube-like projection 8' visible at the left end of the cantilevers in FIG. 7 represents the minute region of the sample 8 in contact with the tip. The projection 8' is represented with its upper surface fixed in space. The projection 8' is an elastic body measuring 2.8 $\mu$m in height and has top and bottom surfaces measuring 4 $\mu$m per side. It is defined to have an elasticity of 12.5 MPa and a Poisson's ratio of 0.248, so as to give the sample a contact stiffness of 53.3 N/m. The cantilever spring constant of 0.045 N/m is thus less than $\frac{1}{1000}$ of the sample contact stiffness. In FIG. 7(*a*), n=1 indicates fundamental resonance mode at a frequency of 96.8 KHz, while n=5 in FIG. 7(*b*) indicates a vibration pattern of fifth order mode at a frequency of 1.58 MHz.

As shown in FIG. 7(*a*), the projection 8' portion representing the sample exhibits almost no deformation and only the cantilever deforms when the frequency is low. Cantilever vibration is therefore unaffected by deformation of the projection portion so that the cantilever vibration pattern does not change even if the elasticity of the projection portion representing the sample changes. In contrast, as shown in FIG. 7(*b*), when the cantilever is imparted with high-frequency vibration, excitation of higher order vibration with nodes at intermediate portions of the cantilever occurs and the center of the projection representing the sample is simultaneously deformed into a thinned and elongated shape. Since the cantilever vibration pattern is affected depending upon the magnitude of this deformation, a change in the elasticity of the projection portion (sample) causes a change in the cantilever vibration amplitude and, as explained in the next paragraph, a change in the resonance frequency. It is therefore possible to evaluate the elasticity of the sample by measuring the vibration amplitude and resonance frequency of the cantilever in higher order mode.

(2) Cantilever resonance frequency

Figure 8:
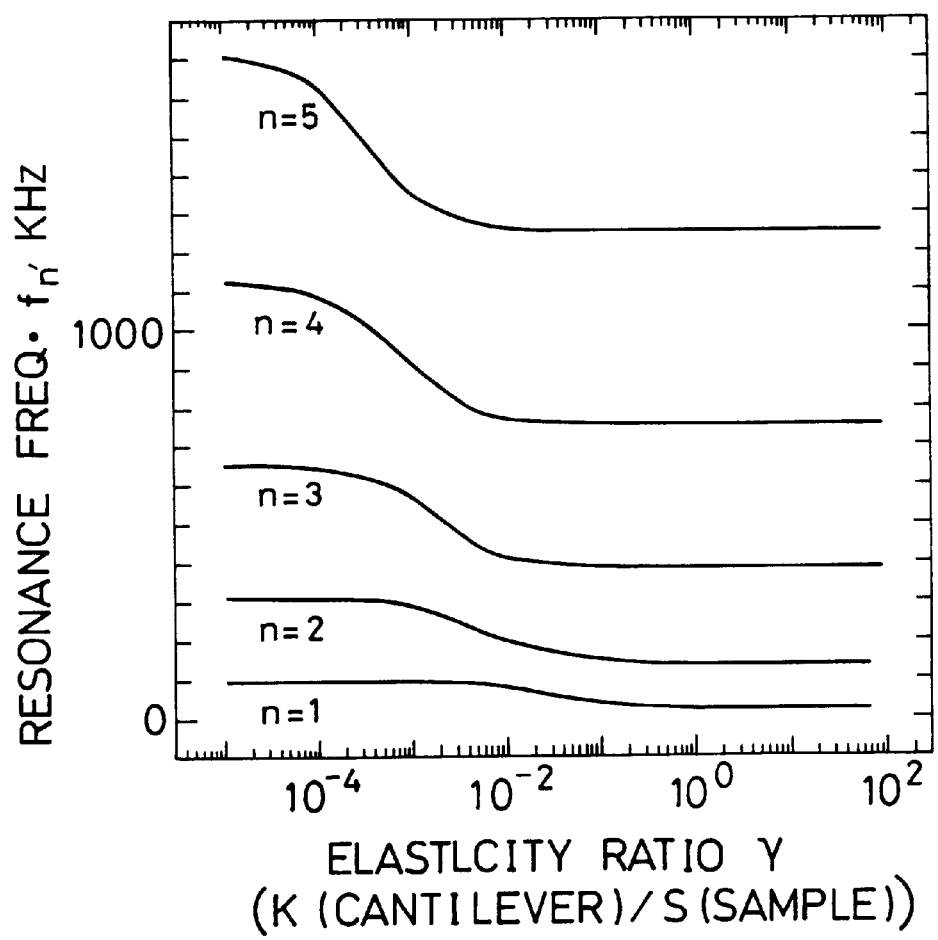
FIG. 8 is a graph showing how resonance frequency varies with the spring constant ratio of the cantilever and the specimen.

It will next be shown that the higher order mode resonance frequency of the cantilever varies with the elasticity of a sample. For this purpose, the resonance frequencies $f_n$ in modes between fundamental resonance mode and fifth order mode were calculated for various spring constant ratios $\gamma$=k/s of the cantilever and the sample. It was found that $f_n$ varies with $\gamma$ as shown in FIG. 8. The calculation was carried out for the boundary conditions of the cantilever being fixed at one end and being supported by a linear spring at the other end by solving the vibration equation for a two-dimensional cantilever beam.

From FIG. 8 it can be seen that the resonance frequency $f_n$ varies only within a specific range of ratio $\gamma$, which is $10^{-2}$–$10^0$ in fundamental vibration mode and is shifted with successively higher modes to $10^{-4}$–$10^{-2}$ in fifth order mode (n=5). This means that while samples with spring constants ranging from around that of the cantilever to around 100 times that of the cantilever can be discriminated from the resonance frequency in the fundamental vibration mode, samples with spring constants; about 100 to 10,000 times that of the cantilever can be discriminated from the fifth order mode resonance frequency. In other words, only by using a higher order vibration mode is it possible to evaluate the elasticity of hard materials.

[2] Observation of fiber reinforced resin

An application to the observation of a fiber reinforced resin (FRP) produced by injection molding PEEK resin dispersed with glass fibers will now be explained.

The strength of FRP varies depending on the state of the interface between the fibers and the matrix (resin). Since this interface has a very fine structure, the elasticity distribution has to be closely examined at a spatial resolution on the nanometer order. An optical detection method was used for measurement of cantilever deformation and vibration. The cantilever used was made of silicon nitride, measured 200 μm in length, 20 μm in width and 0.8 μm in thickness, and had a spring constant of 0.045 N/m and a fundamental resonance frequency of 22 KHz. The tip was made of silicon nitride and measured 2.8 μm in length. The Z-direction extension of the piezoelectric element for scanning the sample was controlled to obtain a force of 1 nN between the sample and the probe.

Under these conditions, the spring constant of the glass fiber is 100 N/m and the spring constant of the PEEK resin is about 10 N/m. Although the two spring constants differed by a factor of 10, neither material deformed since their spring constants were more than 100 times larger than that of the cantilever.

Figure 9:
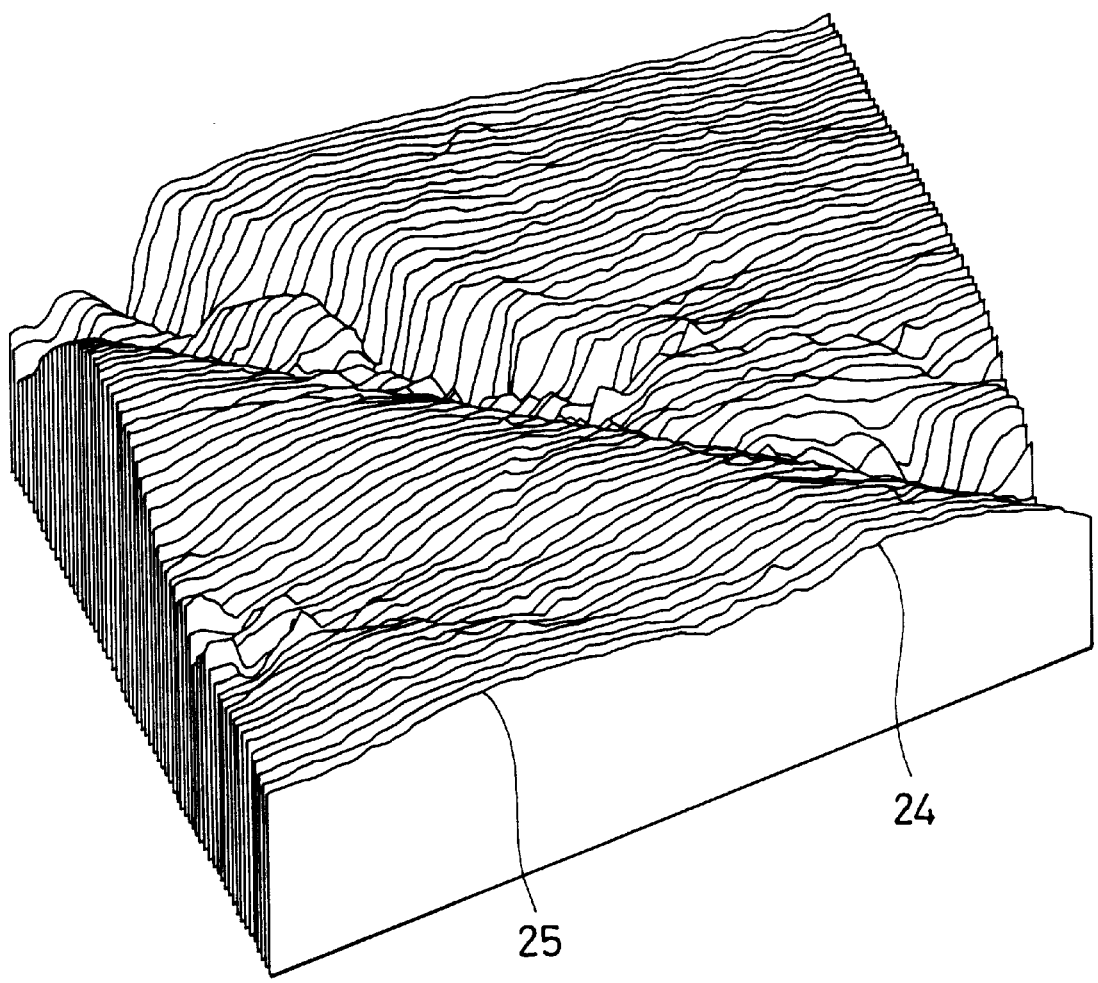
FIG. 9 is a sample topography image.

FIG. 9 is a topography image of the glass fiber sample formed under a contact load condition of 1 nN. The image field is 10 μm and the maximum height difference is 800 μm. The image clearly shows the shape produced by an approximately 5-μm thick glass fiber 24 extending from the upper left to the lower right as half buried in PEEK resin 25, but the materials, glass fiber or PEEK resin, cannot be distinguished.

They could be distinguished, however, when higher order mode vibration was used. An ultrasonic vibrator pressed onto the cantilever support member was used to excite the vibration. Fourth-order vibration of a frequency around 1 MHz amplitude modulated at a frequency of 6 KHz was excited in the cantilever and measurement was conducted using the nonlinear detection method. While the force acting between the sample and the tip varied with time, the mean value per cycle was maintained constant at 1 nN by controlling the Z-direction extension of the piezoelectric element for scanning the sample.

Figure 10:
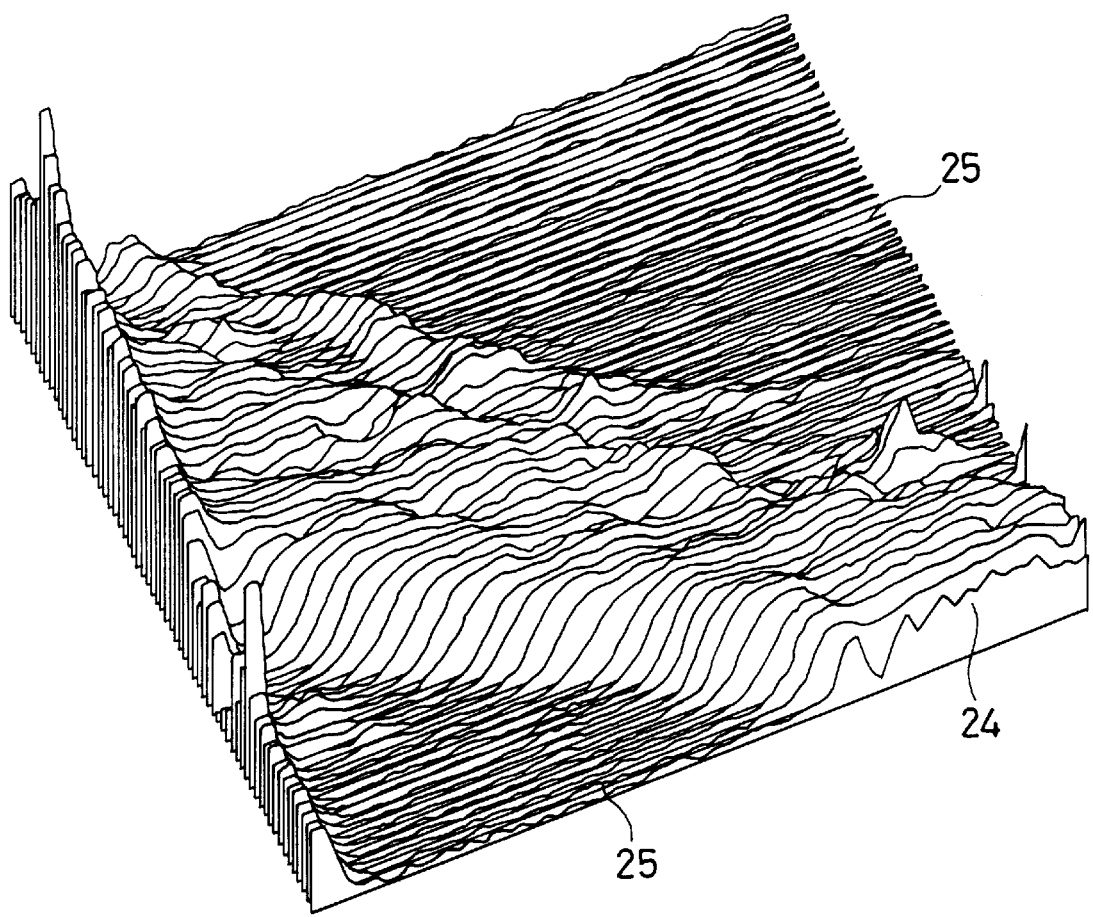
FIG. 10 is a diagram showing the spatial distribution of cantilever vibration amplitude during measurement of the sample of FIG. 9.

FIG. 10 shows the spatial distribution of the cantilever vibration amplitude. The large difference in elasticity between the glass fiber 24 and the PEEK resin 25 portions is obvious. Upon conducting a more detailed examination of these portions, it was found that at a portion where a thin resin layer measuring 100 nm in width and several tens of nm in thickness adhered to the fiber the cantilever vibration amplitude exhibited an intermediate value between those of the resin and the fiber. As a result, the elasticity of resin of a thickness of only several tens of nm could be evaluated.

When the invention method using a cantilever which imparts ultrasonic vibrations to measure physical properties is adopted, no need arises to select the optimum bonding agent for each type of sample and presence of thickness variations and/or bubbles in a bonding agent can be avoided to ensure enhanced measurement reproducibility. In addition, since there is no use of a bonding agent which might contaminate the sample owing to its low vapor pressure, the method can achieve highly reliable measurement in atomic level observation and clean environment applications. The method further enables examination of the condition of the interface between the fibers and matrix of a composite material, large samples (VLSI wafers etc.), samples of irregular shape (magnetic heads, bearing etc.) and micromachines, thereby enabling nondestructive material and defect inspection in minute regions of nanometer scale.

What is claimed is:

1. A method using a cantilever to measure physical properties comprising the steps of bringing a tip provided at one end of a cantilever into contact with a sample and causing a vibrational force of a frequency between 10 and 1000 times a fundamental resonance frequency of the cantilever to act on the cantilever, thereby exciting higher order mode vibration in the cantilever.

2. A method according to claim 1, further comprising the step of measuring an amplitude of a component of the vibration excited in the cantilever having the same frequency as the vibrational force.

3. A method according to claim 1, further comprising the step of measuring elasticity of the sample by measuring change in the resonance frequency of the vibration excited in the cantilever.

4. A method according to claim 1, wherein the vibrational force caused to act on the cantilever is at high-frequency vibrational force amplitude modulated at a low frequency and further comprising the step of measuring the modulation frequency component of the vibration excited in the cantilever.

5. A method according to claim 1, further comprising the steps of exciting in the sample a vibration of a frequency different from the frequency of the vibrational force caused to act on the cantilever and detecting a vibration component of the cantilever vibration whose frequency is the difference between the frequency of the vibrational force caused to act on the cantilever and the sample vibration frequency.

6. A method according to claim 1, further comprising the step of detecting cantilever vibration with an optical deflection detector.

7. A method according to claim 1, further comprising the step of detecting cantilever vibration with a vibration detector.

* * * * *